March 10, 1925.    1,529,156

T. BODDE

TRAIN CONTROL SYSTEM

Filed Jan. 24, 1923

INVENTOR
THEODORE BODDE
BY
Morgan Cavanagh Whitehead
ATTORNEYS

Patented Mar. 10, 1925.

1,529,156

UNITED STATES PATENT OFFICE.

THEODORE BODDE, OF NIAGARA FALLS, NEW YORK, ASSIGNOR TO THE REGAN SAFETY DEVICES COMPANY, INC., OF NEW YORK, N. Y., A CORPORATION OF NEW YORK.

TRAIN-CONTROL SYSTEM.

Application filed January 24, 1923. Serial No. 614,644.

*To all whom it may concern:*

Be it known that I, THEODORE BODDE, a citizen of the United States, and resident of Niagara Falls, in the county of Niagara and State of New York, have invented certain new and useful Improvements in Train-Control Systems, of which the following is a specification.

This invention relates to train control systems, and more particularly to a system for controlling the movement of trains automatically from the roadside in response to traffic conditions; and has special reference to the provision of a system of the intermittent contact or ramp type in which cooperating train and track mechanisms are operated from a vehicle source of energy in response to different roadside conditions.

The principal objects of my present invention may be said to include the provision of a train control system in which a train carried mechanism intermittently cooperates with roadside mechanism for producing such effects as "proceed," "speed restrictive" and "stop" effects on the train in response to roadside "clear," "caution" and "danger" track conditions, the said vehicle and roadside mechanism being operated only by a vehicle carried source of energy; the further provision of a system of this nature in which the roadside mechanism comprises a ramp means cooperating with the vehicle carried mechanism for intermittently controlling vehicle circuits, and roadside means for determining the manner or character of energization of the vehicle circuits, with the said vehicle circuits fed from the vehicle source of energy by way of or through the roadside mechanism; the further provision of a train control system of this nature in which the roadside mechanism includes means for determining the phase of current for energizing the vehicle circuits from the vehicle source of energy; and the still further provision of novel vehicle circuit mechanism for maintaining the vehicle mechanism in a condition as predetermined by the roadside mechanism.

To the accomplishment of the foregoing and such other objects as will appear hereinafter, my invention consists in the elements and their relation one to the other, as hereinafter particularly described and sought to be defined in the claims, reference being had to the accompanying drawing which shows preferred embodiments of my invention, and in which:—

Figure 1:
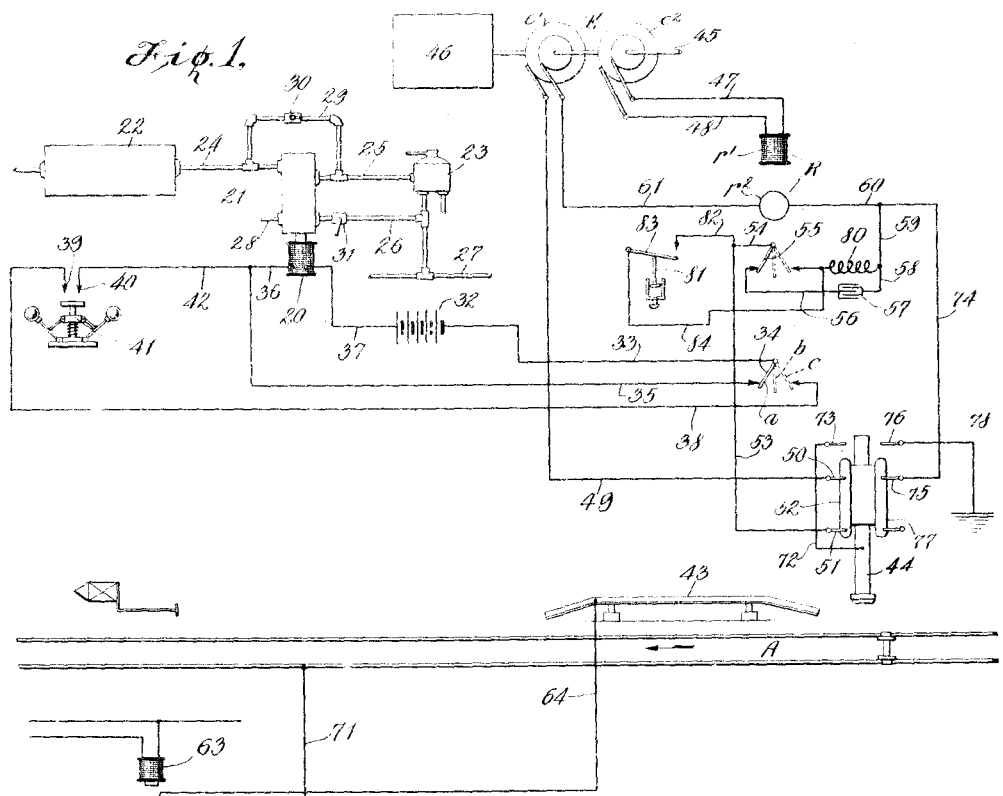
Figure 2:
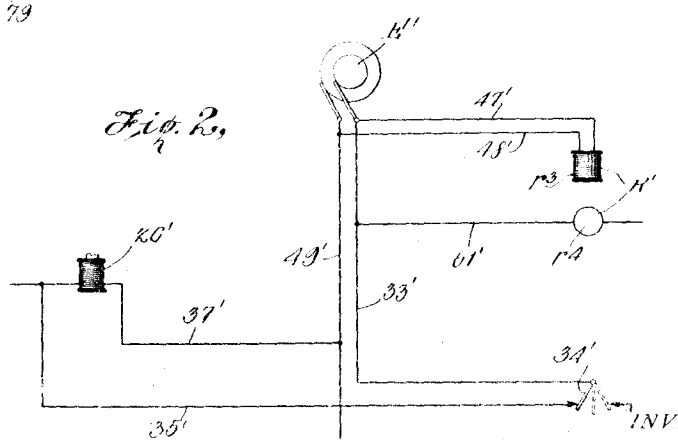

Figure 1 is a diagrammatic view showing the vehicle carried apparatus and circuits and the roadside apparatus and circuits for one block, and Figure 2 is a diagrammatic view showing a portion of the vehicle carried apparatus in modified form.

In the train control system of my present invention, for directly controlling the movement of the train there is provided an electroresponsive device for controlling the operation of the air brake system, the said electroresponsive device being under the control of cooperating train and roadside mechanism and being operated thereby in accordance with roadside conditions. The electroresponsive device comprises in the preferred construction an electromagnet 20 which controls the operation of a combined reservoir and brake valve 21 of the type disclosed in the patent to A. G. Shaver No. 1,411,526 of April 4, 1922, the said reservoir and brake valve being interposed between the main reservoir 22 of the air brake system and the engineman's brake valve 23 and being connected thereto by means of the piping 24 and 25 respectively, the said reservoir and brake valve 21 including a reservoir valve which under normal conditions permits the free flow of reservoir air from the main reservoir to the engineman's brake valve, and which under unsafe running conditions of the train is closed to cut off the supply of air from the main reservoir to the engineman's valve.

The combined reservoir and brake valve 21 is also connected by means of the pipe 26 to the brake pipe 27 of the air brake system, and to exhaust through the pipe 28, the construction and operation of these parts being such that under normal running conditions of the train the brake valve of the valve mechanism 21 is closed to prevent venting communication between the air brake system and the exhaust 28, and under abnormal or unsafe running conditions of the train, the said valve is opened to vent the brake pipe so that the brakes are applied.

For the purpose of rendering the automatic control mechanism inactive, as when it is desired to run the train without automatic control, there is provided a bypass 29 connecting the pipes 24 and 25, the said bypass being controlled by a cock 30 which is normally closed as shown in Figure 1, the opening of the cock permitting the free flow of reservoir air from the main reservoir 22 to the engineman's brake valve irrespective of any operation of the reservoir and brake valve 21; and there is also provided a cock 31 in the piping 26, the said cock being normally open as shown in the drawings and being closed when it is desired to render inoperative the control of the brake valve of the valve mechanism 21.

In the operation of the train control system the electromagnet 20 is energized under "safe" roadside conditions and is deenergized under "unsafe" roadside conditions to effect the desired operations of the reservoir and brake valve mechanism 21. For directly controlling the operation of the electromagnet 20, there is provided a train carried circuit which is normally energized by a train-carried source of energy such as the battery 32, the said circuit including the battery 32, conductor 33, a movable contact 34 normally occupying the full line position $a$ shown in Figure 1 and movable from this position to a neutral dotted line position $b$ and an active dotted line position $c$, a conductor 35, conductor 36, the coil of the magnet 20, and conductor 37. This circuit, which is normally energized under safe running conditions, is deenergized under "danger" traffic conditions, the contact 34 being movable from the position $a$ to the position $b$ under such "danger" roadside conditions, as will be detailed further hereinafter, this movement of the contact to neutral position opening the circuit for effecting deenergization of the magnet 20. Under "caution" track conditions the contact 34 is caused to assume the position $c$ for the closing of a second circuit to the magnet 20 for placing the same under the control of the speed of the train, this second circuit comprising the battery 32, the conductor 33, contact 34 in position $c$, conductor 38, contacts 39 and 40 open when the speed of the train exceeds a predetermined medium limit and closed by the speed circuit controller 41 when the movement of the train is reduced below such predetermined limit, conductors 42 and 36, electromagnet 20, and conductor 37 to the other pole of battery 32.

Thus the actuation of the three-position contact element 34 into positions $a$, $b$ and $c$ will energize, deenergize the electromagnet 20 and place the energization of the same under the control of the speed controller 41 respectively to produce "proceed," "stop" and "restrictive speed" train effects respectively.

For controlling the behaviour or operation of the contact 34, there are provided cooperating train and roadside mechanism which includes roadside means which in the present form of my invention comprises a plurality of ramp rails spaced along the roadside, a rail such as indicated at 43 being provided for each section or block of the track such as the block A shown in the drawings, the said ramp rail comprising means for transmitting energy to a train carried shoe mechanism 44 under given roadside conditions, such energy being transmitted to a translating device such as a relay generally designated as R, the action of which directly controls the operation of contact 34.

Under normal running conditions of the train, with the train running between ramp rails, the translating device R, which comprises a relay of the two-element type having a field coil $r'$ and an armature coil $r^2$, is energized by a train carried source of energy generally designated as E through a plurality of local circuits, one for the field coil $r'$, and the other for the relay coil $r^2$. In the preferred construction the source of energy comprises, as shown in Figure 1 of the drawings, a plurality of A. C. generators $e'$ and $e^2$ fixed on a common shaft 45 and driven from a motor 46 connected to said shaft. These A. C. generators are designed to generate current of like frequency, but of different phases for a purpose that will appear more in detail presently. The generator $e^2$ is connected to always energize the relay $r'$ by means of the conductors 47 and 48. The generator $e'$ energizes the armature coil $r^2$ by means of the local circuit which includes the generator $e'$, conductor 49, contacts 50 and 51 normally bridged by the shoe contact 52, conductors 53 and 54, contact 55 controlled by the relay R and normally occupying the full line position shown in Figure 1, conductor 56, a condenser 57, conductors 58, 59 and 60, relay coil $r^2$, and conductor 61 to the other terminal of the generator $e'$.

The two-element relay R of the present invention is constructed to operate in response to "clear," "caution" and "danger" conditions for operating the contacts 55 and 34 so as to position the same in any of three positions. To accomplish this the elements $r'$ and $r^2$ of the relay are selectively energized by changing the relative phase displacement of the energizing currents for the elements, and in the present invention this is produced by continuously energizing the coil $r'$ and by changing the phase of the current in the energizing coil $r^2$ responsive to roadside conditions, with the operation of the relay elements maintained by the vehicle or local circuits therefor after any change therein has been produced by the roadside mechanism.

Under the "clear" conditions described, the current phase in the relay element $r^2$ is so displaced by the condenser 57 in the normal energizing circuit that the armature $r^2$ is held in position for maintaining the contacts 34 and 55 in full line position as shown. When the train passes a ramp under "clear" roadside conditions, the relay R is controlled by the cooperation of the shoe 44 and the ramp 43, the cooperation being such that as the shoe rides over the ramp, the normally closed local or train circuit described is opened and another circuit substituted therefor, which other circuit is operated in response to traffic conditions. The substituted circuit comprises a partial roadside circuit which is connected to the ramp 43, and a partial train carried circuit which includes the relay coil $r^2$ and the train source of energy $e'$, the two partial circuits combining to form a completed circuit for determining the further operation of the relay R. In the present construction the partial roadside circuit includes a circuit phase changer designated as 62 controlled preferably by the roadside signalling apparatus such as the signalling relay 63, the said phase changer including selective means connectable in the partial circuit, the said partial circuit under "clear" roadside conditions including the conductor 64 connected to the ramp 43, neutral armature 65 controlled by the signal relay 63, conductor 66, a condenser 67, polarized contact 68 controlled by the signal relay 63, conductor 69, a circuit controller 70 which is connected to the signalling apparatus and which is closed under "safe" and "caution" conditions as indicated by the positions $d$ and $e$ and is opened under "danger" conditions as indicated by the position $f$ of the controller arm 70, and the conductor 71 connected to one of the track rails. When the shoe 44 under "clear" roadside conditions rides the ramp 43, the normally closed vehicle circuit will be broken at the contact 51 and the partial roadside circuit will be connected as a partial vehicle circuit including the shoe 44, conductor 72, a contact 73, shoe contact 52, contact 50, conductor 49, generator $e'$, conductor 64, relay coil $r^2$, conductors 80 and 74, contacts 75 and 76 bridged by shoe contact 77, conductor 78 connected to the framework of the vehicle and to the track rail. When the partial circuits are united into the completed circuit, the train carried energy will energize the relay coil $r^2$ as determined by the roadside phase changer 62, and under "clear" conditions the condenser 67 in this circuit will produce a leading current therein to energize the relay coil $r^2$ so as to move the same in a position for positioning the contacts 34 and 55 in the full line position shown. As the shoe 44 leaves the ramp 43, the vehicle circuit which includes the condenser 57 will again be closed at the contact 51, and the combined roadside and vehicle partial circuits will be broken, the vehicle circuit being therefore substituted for the partial circuits for maintaining the energization of the relay $r^2$ in that phase produced by the roadside phase changer, the condensers 57 and 67 being so designed as to effect this result.

Under "caution" roadside conditions the polarized contact 68 of the roadside phase changer 62 is moved to the inclined dotted line position shown, for substituting an inductance 79 for the condenser 67 in the roadside partial circuit, so that when the shoe 44 rides the ramp 43 for the uniting of the partial roadside and vehicle circuits, the relay coil $r^2$ will be energized from the train carried source of energy with current of a phase different than the normal energizing current, the inductance 79 producing a lag in the current with respect to the E. M. F. of the circuit, this energization of the armature coil $r^2$ actuating the contact 34 and 55 to the inclined dotted line position. When the shoe 44 leaves the ramp 43 under these "caution" conditions, the relay coil $r^2$ will be maintained energized by the changed phase current, the movement of the contact 55 to the inclined dotted line position effecting the substitution of an inductance 80 for the condenser 57 in the train or local circuit of the relay coil $r^2$, the roadside and train inductances 79 and 80 being so designed as to produce this effect.

Under "danger" track conditions the polarized contact 68 of the roadside pole changer assumes the vertical dotted line position shown and the neutral contact 65 is opened by the deenergization of the signal relay 63, and when the shoe 44 rides the ramp 43 under these "danger" conditions, the combined roadside and vehicle partial circuits are open, and the relay coil $r^2$ remains deenergized, the contacts 55 and 34 controlled thereby moving to the neutral vertical dotted line position.

For the purpose of producing the desired phase relation between the currents in the relay coils $r^1$ and $r^2$, the generators $e'$ and $e^2$ are so displaced as to produce a neutral position of the armature coil $r^2$ when no capacity or inductance is introduced in the circuits thereto and to produce the opposite active positions with capacity and inductance selectively introduced in such circuit.

With the above described construction, it will therefore be seen that the translating device or relay R may be differently energized to produce different control operations tions thereof such as "clear" and "caution" control operations, and may be deenergized to produce a "danger" control operation, the behaviour of the relay being determined by roadside conditions, and the relay being energized from a vehicle source of energy only.

In the operation of the system described, when the vehicle is moving under "clear" roadside conditions the contact 34 is maintained in the position $a$ by the continued energization of the relay R and the electromagnet 20 is energized by the circuit closed by this contact 34, the valve 21 being operated to permit unlimited speed ahead. When the train reaches a "caution" ramp, the relay R is energized by changing the relative phase displacement of the currents in the elements therein to move the contact 34 to the dotted line position $c$ for closing the speed control circuit to the electromagnet 20, placing the operation of the magnet under the control of the speed of the vehicle. Under "danger" conditions the relay R is deenergized and the contact 34 controlled thereby assumes the neutral position $b$, effecting the opening of the circuits to the electromagnet 20 for operating the valve 21 to apply the brakes of the vehicle to bring the same to a stop.

For the purpose of permitting movement of the vehicle under restrictive speed after the same has been brought to a stop, there may be provided a resetting means which includes a manually operable reset means 81 controlled by the engineman and effective for closing the "caution" circuit to the relay coil $r^2$, the said circuit including the source of energy $e'$, conductor 49, contacts 50 to 52, conductor 53, conductor 82, contact 83 operated by the reset means 81, conductor 84, inductance 80, conductors 59 and 60, relay element $r^2$, and conductor 61 to the generator $e'$. With the closing of this circuit, it will be seen that the relay is energized through the inductance 80 for causing the contacts 55 and 34 to assume the "caution" inclined dotted line position.

Although in the preferred form of my invention I provide two independent vehicle sources of energy which are displaceable to produce the correct phase relation between the relay elements, it will be obvious that a single generator may be employed for this purpose. Although, furthermore, I have shown in Figure 1 the electromagnet 20 operated by a source of energy independent of the source of energy controlling the relay R, it will be apparent that these elements may be operated from the same source. A construction including these modifications is shown in part in Fig. 2 of the drawings, and referring to this figure the relay elements $r^3$ and $r^4$ of the relay R' are connected to a single energy source E', the relay element $r^3$ being connected thereto by means of conductors 47' and 48' and the relay coil $r^4$ being connected thereto by means of the conductors 61' and circuit mechanism similar to that shown in Fig. 1, which in turn is connected to the source of energy by means of the conductor 49'. The electromagnet 20' also may be energized from the common source of energy E' and normally by means of the circuit including said source of energy, conductor 49', conductor 37', coil 20', conductor 35', contact 34', and conductor 33'.

While I have shown my device in the preferred form, it will be obvious that many changes and modifications may be made in the structure disclosed without departing from the spirit of the invention, defined in the following claims.

I claim:

1. In combination, vehicle carried mechanism and provisions for controlling the operation of the same in response to roadside conditions, comprising a three position element, vehicle means differently energizable to operate said element into either of two of its three positions, cooperable vehicle and roadside contact means for operating the said vehicle means, roadside circuit mechanism operable in accordance with roadside conditions for determining the manner of energizing the said vehicle means, and a vehicle source of energy effective through said roadside mechanism and contact means for energizing said vehicle means in the manner determined by the roadside mechanism.

2. In combination, vehicle carried mechanism and provisions for controlling the operation of the same in response to roadside conditions, comprising a three position element, vehicle means differently energizable to operate said element into either of two of its three positions, intermittently cooperable vehicle and roadside contact means for operating the said vehicle means, roadside circuit mechanism operable in accordance with roadside conditions for determining the manner of energizing the said vehicle means, and a vehicle source of energy effective through said roadside mechanism and contact means for energizing said vehicle means in the manner determined by the roadside mechanism.

3. In combination, vehicle carried mechanism and provisions for controlling the operation of the same in response to roadside conditions, comprising a three position element, vehicle means differently energizable to operate the element into either of two positions and deenergizable to operate the same in its third position, cooperable vehicle and roadside contact means for operating the said vehicle means or rendering the same inoperative, roadside circuit mecha nism operable in accordance with roadside conditions for determining the manner of energizing or deenergizing of the said vehicle means, and a vehicle source of energy effective through said roadside mechanism and contact means for energizing said vehicle means in the manner determined by the roadside mechanism.

4. In combination, vehicle carried mechanism and provisions for controlling the operation of the same in response to roadside conditions, comprising a three position element, a relay having a three-position contact element differently energizable to produce different control operations thereof, cooperable vehicle shoe and roadside ramp means for operating the said relay, roadside circuit mechanism operable in accordance with roadside conditions for determining the manner of energizing said relay, and a vehicle source of energy effective through said roadside mechanism and shoe and ramp means for energizing said relay in the manner determined by the roadside mechanism.

5. In combination, vehicle carried mechanism and provisions for controlling the operation of the same in response to roadside conditions, comprising vehicle means differently energizable by current phase changes to produce different control operations thereof, cooperable vehicle and roadside contact means for operating the said vehicle means, roadside mechanism operable in accordance with roadside conditions for determining the current phase for energizing the said vehicle means, and a vehicle source of energy effective through said roadside mechanism and contact means for energizing said vehicle means in the manner determined by the roadside mechanism.

6. In combination, vehicle carried mechanism and provisions for controlling the operation of the same in response to roadside conditions, comprising vehicle means differently energizable by current phase changes to produce different control operations thereof, intermittently cooperable vehicle and roadside contact means for operating the said vehicle means, roadside mechanism operable in accordance with roadside conditions for determining the current phase for energizing the said vehicle means, and a vehicle source of energy effective through said roadside mechanism and contact means for energizing said vehicle means in the manner determined by the roadside mechanism.

7. In combination, vehicle carried mechanism and provisions for controlling the operation of the same in response to roadside conditions, comprising a three-position element, vehicle means differently energizable to operate said element into either of two of its three positions, cooperable vehicle and roadside contact means for operating the said vehicle means, roadside mechanism operable in accordance with roadside conditions for determining the manner of energizing the said vehicle means, and a vehicle source of energy effective through said roadside mechanism and contact means for energizing said vehicle means in the manner determined by the roadside mechanism, and instrumentalities on the vehicle effective for retaining the vehicle means in the condition of energization produced by the roadside mechanism.

8. In combination, vehicle carried mechanism and provisions for controlling the operation of the same in response to roadside conditions, comprising a three-position element, vehicle means differently energizable to operate the element into either of two positions and deenergizable to operate the same to its third position, cooperable vehicle and roadside contact means for operating the said vehicle means or rendering the same inoperative, roadside mechanism operable in accordance with roadside conditions for determining the manner of energizing or deenergizing of the said vehicle means, and a vehicle source of energy effective through said roadside mechanism and contact means for energizing said vehicle means in the manner determined by the roadside mechanism, and instrumentalities on the vehicle effective for retaining the vehicle means in the condition of energization or deenergization produced by the roadside mechanism.

9. In combination, vehicle carried mechanism and provisions for controlling the operation of the same in response to roadside conditions, comprising a three-position element, vehicle means differently energizable to operate said element into either of two of its three positions, cooperable vehicle and roadside contact means for operating the said vehicle means, roadside mechanism operable in accordance with roadside conditions for determining the manner of energizing the said vehicle means, and a vehicle source of energy effective through said roadside mechanism and contact means for energizing said vehicle means in the manner determined by the roadside mechanism, and instrumentalities on the vehicle effective for retaining the vehicle means in the condition of energization produced by the roadside mechanism, said instrumentalities including said vehicle source of energy.

10. In combination, vehicle carried mechanism and provisions for controlling the operation of the same in response to roadside conditions, comprising vehicle means differently energizable by current phase changes to produce different control operations thereof, cooperable vehicle and roadside contact means for operating the said vehicle means, roadside mechanism operable in accordance with roadside conditions for determining the current phase for energizing the said vehicle means, and a vehicle source of energy effective through said roadside mechanism and contact means for energizing said vehicle means in the manner determined by the roadside mechanism, and instrumentalities on the vehicle effective for retaining the vehicle means in the condition of energization produced by the roadside mechanism.

11. In combination, vehicle carried mechanism and provisions for controlling the operation of the same in response to roadside conditions, comprising vehicle means differently energizable by changes in phase of an energizing current to produce different control operations thereof, a source of energy therefor, cooperable vehicle and roadside contact means for operating the said vehicle means, and roadside mechanism associated with the contact means and operable in accordance with roadside conditions for determining the phase of the energizing current for the said vehicle means.

12. In combination, vehicle carried mechanism and provisions for controlling the operation of the same in response to roadside conditions, comprising vehicle means differently energizable by changes in phase of an energizing current to produce different control operations thereof, a source of energy therefor, intermittently cooperable vehicle and roadside contact means for operating the said vehicle means, and roadside mechanism associated with the contact means and operable in accordance with roadside conditions for determining the phase of the energizing current for the said vehicle means.

13. In combination, vehicle carried mechanism and provisions for controlling the operation of the same in response to roadside conditions, comprising vehicle means differently energizable by changes in phase of an energizing current to produce different control operations thereof, a source of energy therefor, cooperable vehicle and roadside contact means for operating the said vehicle means, and roadside mechanism associated with the contact means and operable in accordance with roadside conditions for determining the phase of the energizing current for the said vehicle means, and instrumentalities on the vehicle effective for retaining the vehicle means in the phase of energization produced by the roadside mechanism.

14. In combination, vehicle carried mechanism and provisions for controlling the operation of the same in response to roadside conditions, comprising vehicle means differently energizable by changes in phase of an energizing current and also deenergizable to produce different control operations thereof, a source of energy therefor, cooperable vehicle and roadside contact means for operating the said vehicle means, and roadside mechanism associated with the contact means and operable in accordance with roadside conditions for determining the phase of energization and the deenergization of the said vehicle means.

15. In combination, vehicle carried mechanism and provisions for controlling the operation of the same in response to roadside conditions, comprising electromagnetic means on the vehicle, differently energizable by current phase variations, a vehicle normally closed circuit therefor including a source of energy, vehicle and roadside contact means intermittently cooperable to break the said circuit, and roadside mechanism for determining the phase of energization for said electromagnetic means and active during cooperation of said contact means.

16. In combination, vehicle carried mechanism and provisions for controlling the operation of the same in response to roadside conditions, comprising electromagnetic means on the vehicle differently energizable by current phase variations, a vehicle normally closed circuit therefor including an alternating current source of energy, vehicle and roadside contact means intermittently cooperable to break the said circuit, and roadside mechanism for determining the phase of energization for said electromagnetic means and active during cooperation of said contact means.

17. In combination, vehicle carried mechanism and provisions for controlling the operation of the same in response to roadside conditions, comprising a stick relay on the vehicle differently energizable by current phase variations, a vehicle normally closed circuit therefor including a source of energy, vehicle and roadside contact means intermittently cooperable to break the said circuit and roadside mechanism for determining the phase of energization for said stick relay and active during cooperation of said contact means.

18. In combination, vehicle carried mechanism and provisions for controlling the operation of the same in response to roadside conditions, comprising electromagnetic means on the vehicle differently energizable by current phase variations, a vehicle normally closed circuit therefor including a source of energy, vehicle and roadside contact means intermittently cooperable to break the said circuit and roadside mechanism for determining the phase of energization for said electromagnetic means and active during cooperation of said contact means, the said electromagnetic means being energizable by said source of energy by way of said roadside mechanism and contact means during such cooperation of the contact means.

19. In combination, vehicle carried mechanism and provisions for controlling the operation of the same in response to roadside conditions, comprising electromagnetic means on the vehicle differently energizable by current phase variations, a vehicle normally closed circuit therefor including a source of energy, vehicle and roadside contact means intermittently cooperable to break the said circuit, and roadside mechanism for determining the phase of energization for said electromagnetic means and active during cooperation of said contact means, and instrumentalities on the vehicle effective for retaining the vehicle means in the condition of energization produced by the roadside mechanism.

20. In combination, vehicle carried mechanism and provisions for controlling the operation of the same in response to roadside conditions, comprising electromagnetic means on the vehicle differently energizable by current phase variations and deenergizable, a vehicle normally closed circuit therefor including a source of energy, vehicle and roadside contact means intermittently cooperable to break the said circuit and roadside mechanism for determining the phase of energization or the deenergization for said electromagnetic means and active during cooperation of said contact means.

21. In combination, vehicle carried mechanism and provisions for controlling the operation of the same in response to roadside conditions, comprising electromagnetic means on the vehicle differently energizable by current phase variations, a normally closed circuit therefor including a vehicle source of energy, cooperable vehicle and roadside contact means for intermittently breaking said circuit and producing a partial vehicle circuit including the electromagnetic means and the energy source, a roadside partial circuit including mechanism for determining the phase of current therein, and means for connecting the vehicle and roadside partial circuits into a completed circuit when the vehicle and roadside contact means cooperate.

22. In combination, vehicle carried mechanism and provisions for controlling the operation of the same in response to roadside conditions, comprising a three-position element, electromagnetic means on the vehicle differently energizable to operate said element into either of two of its three positions, a normally closed circuit therefor including a vehicle source of energy, cooperable vehicle and roadside contact means for intermittently breaking said circuit and producing a partial vehicle circuit including the electromagnetic means and the energy source, a roadside partial circuit including mechanism for determining the current characteristic therein, and means for connecting the vehicle and roadside partial circuits into a completed circuit when the vehicle and roadside contact means cooperate.

23. In combination, vehicle carried mechanism and provisions for controlling the operation of the same in response to roadside conditions comprising a three-position element, electromagnetic means on the vehicle differently energizable to operate the element into either of two positions and deenergizable to operate the same to its third position, a normally closed circuit therefor including a vehicle source of energy, cooperable vehicle and roadside contact means for intermittently breaking said circuit and producing a partial vehicle circuit including the electromagnetic means and the energy source, a roadside partial circuit including mechanism for determining the current characteristic therein or the deenergization thereof, and means for connecting the vehicle and roadside partial circuits into a completed circuit when the vehicle and roadside contact means cooperate.

24. In combination, vehicle carried mechanism and provisions for controlling the operation of the same in response to roadside conditions, comprising electromagnetic means on the vehicle differently energizable by current phase variations, a normally closed circuit therefor including a vehicle source of energy, cooperable vehicle and roadside contact means for intermittently breaking said circuit and producing a partial vehicle circuit including the electromagnetic means and the energy source, a roadside partial circuit including mechanism for determining the phase of current therein, and means for connecting the vehicle and roadside partial circuits into a completed circuit when the vehicle and roadside contact means cooperate, and instrumentalities on the vehicle effective for retaining the vehicle means in the condition of energization produced by the roadside mechanism.

25. In combination, vehicle carried mechanism and provisions for controlling the operation of the same in response to roadside conditions comprising electromagnetic means on the vehicle differently energizable by current phase variations, a vehicle source of energy, a plurality of vehicle circuits one substitutive for another and each including the said source of energy and the electromagnetic means, the circuits having means for effecting variations in the phase of the current energizing the electromagnetic means, cooperable vehicle and roadside contact means for intermittently breaking either of the vehicle circuits and producing a partial vehicle circuit including the electromagnetic means and the energy source, a roadside partial circuit including mechanism for determining the current phase characteristic therein, and means for connecting the vehicle and roadside partial circuits into a completed circuit when the vehicle and roadside contact means cooperate.

26. In combination, vehicle carried mechanism and provisions for controlling the operation of the same in response to roadside conditions comprising electromagnetic means on the vehicle differently energizable to produce different control operations thereof, a vehicle source of energy, a plurality of vehicle circuits one substitutive for another and each including the said source of energy and the electromagnetic means, the circuits having substitutive capacitive and inductive means for effecting variations in the phase of the current energizing the electromagnetic means, cooperable vehicle and roadside contact means for intermittently breaking either of the vehicle circuits and producing a partial vehicle circuit including the electromagnetic means and the energy source, a roadside partial circuit including interchangeable capacitive and inductive mechanism for determining the current phase characteristic therein, and means for connecting the vehicle and roadside partial circuits into a completed circuit when the vehicle and roadside contact means co-operate.

27. In a train control system, vehicle carried mechanism comprising electromagnetic means, differently energizable by current phase variations, a vehicle source of energy, a plurality of vehicle circuits one substitutive for another and each including the said source of energy and the electromagnetic means, the circuits having interchangeable means for effecting variations in the phase of the current energizing the electromagnetic means, and a circuit controller common to both circuits and operative for intermittently breaking either of the circuits in the movement of the vehicle over a roadbed.

28. In a train control system, vehicle carried mechanism comprising electromagnetic means differently energizable by current phase variations, a vehicle source of energy, a plurality of vehicle circuits one substitutive for another and each including the said source of energy and the electromagnetic means, the circuits having interchangeable capacitive and inductive means for effecting variations in the phase of the current energizing the electromagnetic means, and a circuit controller common to both circuits and operative for intermittently breaking either of the circuits in the movement of the vehicle over a roadbed.

29. In a train control system, vehicle carried mechanism comprising a stick relay differently energizable by current phase variations, a vehicle source of energy, a plurality of vehicle circuits one substitutive for another and each including the said source of energy and the stick relay, the circuits having interchangeable means for effecting variations in the phase of the current energizing the stick relay, and a circuit controller common to both circuits and operative for intermittently breaking either of the circuits in the movement of the vehicle over a roadbed.

30. In a train control system, track mechanism comprising contact means cooperating with vehicle mechanism in the movement of the vehicle over a roadbed, and a partial roadside circuit connected to said contact means, the said roadside circuit including interchangeable capacitive and inductive mechanism for predetermining the current phase in said circuit.

31. In a train control system, vehicle carried mechanism comprising electromagnetic means differently energizable by current phase variations, a vehicle source of energy, a plurality of vehicle circuits one substitutive for the other and each including the said source of energy and the electromagnetic means, the circuits having interchangeable means for effecting variations in the phase of the current energizing the electromagnetic means, cooperating vehicle carried and roadside mechanism for breaking either of the circuits in the movement of the vehicle on the roadbed, and roadside mechanism for determining the phase of current energization of said electromagnetic means.

32. In a train control system, vehicle carried mechanism comprising electromagnetic means differently energizable by current phase variations, a vehicle source of energy, a plurality of vehicle circuits one substitutive for the other and each including the said source of energy and the electromagnetic means, the circuits having interchangeable, capacitive and inductive means for effecting variations in the phase of the current energizing the electromagnetic means, cooperating vehicle carried and roadside mechanism for breaking either of the circuits in the movement of the vehicle on the roadbed, and roadside capacitive and inductive mechanism for determining the phase of current energization of said electromagnetic means.

33. In combination, vehicle carried mechanism and provisions for controlling the operation thereof comprising a relay having a field coil and an armature coil, means on the vehicle for energizing the said coils with currents of different relative phase displacements, cooperable vehicle and roadside conductive contact means for operating one of said coils, and a roadside mechanism including a phase changer for determining the character of energization of said operated coil.

34. In combination, vehicle carried mech anism and provisions for controlling the operation thereof comprising a relay having a field coil and an armature coil, means on the vehicle for energizing the said coils with currents of different relative phase displacements, cooperable vehicle and roadside contact means for operating one of said coils, and a roadside mechanism including a phase changer for determining the character of energization of said operated coil, and a vehicle source of energy for energizing the said coils and for energizing the operated coil by way of the roadside phase changer during the cooperative periods of the vehicle and roadside contact means.

35. In combination, vehicle carried mechanism and provisions for controlling the operation thereof comprising a relay having a field coil and an armature coil, means on the vehicle for energizing the said coils with currents of different relative phase displacements, cooperable vehicle and roadside conductive contact means for operating one of said coils, and a roadside mechanism including a phase changer for determining the character of energization of said operated coil, and independent sources of energy for the field and armature coils of said relay.

Signed at Niagara Falls, in the county of Niagara and State of New York, this 15th day of January, A. D. 1923.

THEODORE BODDE.